M. G. DELANEY.
FILM REEL.
APPLICATION FILED DEC. 12, 1912.
1,144,693.
Patented June 29, 1915
3 SHEETS—SHEET 3.
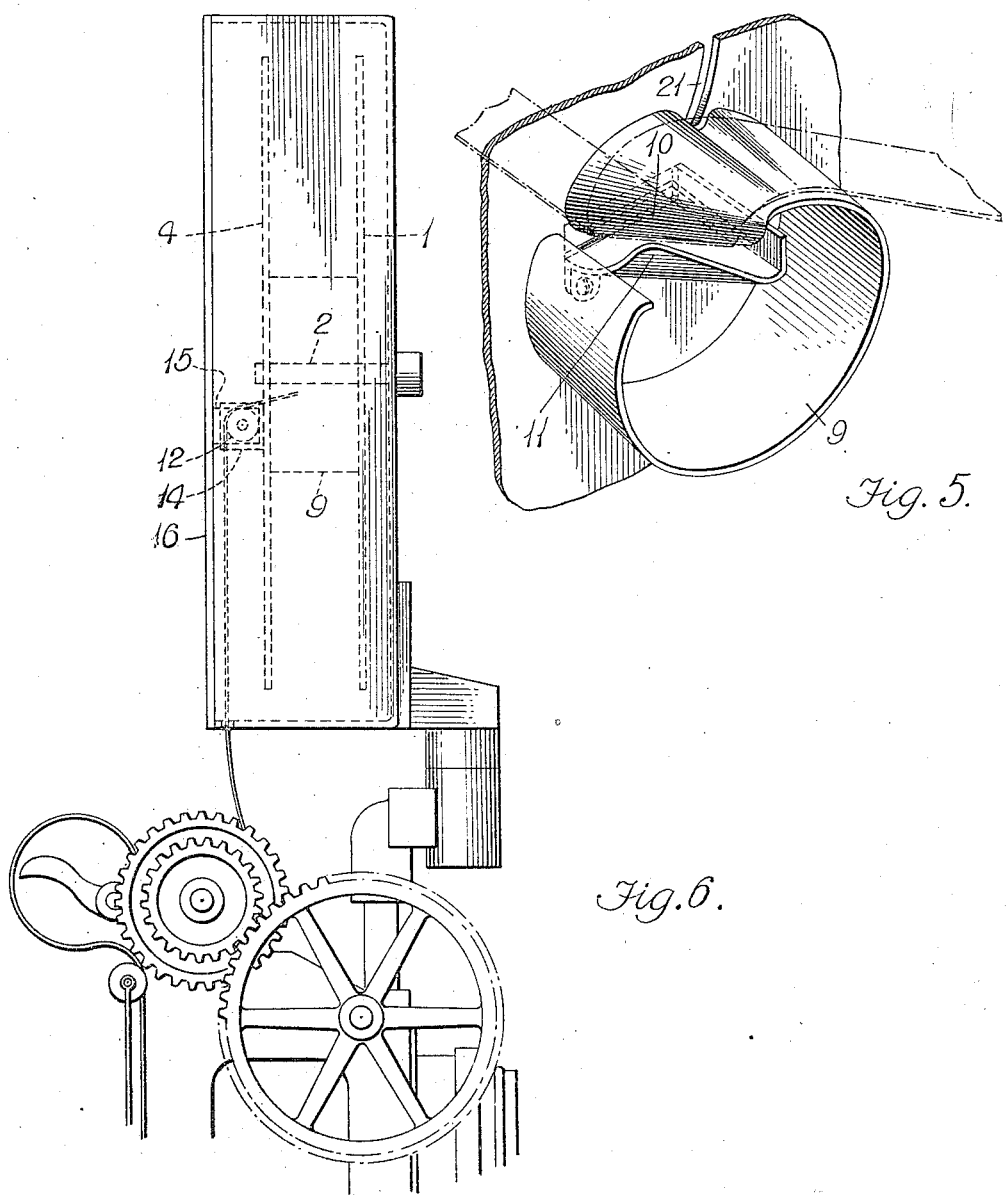
Fig. 5.
Fig. 6.
Witnesses
Chas. W. Stauffiger
Anna M. Dorr
Inventor
Michael G. Delaney,
By 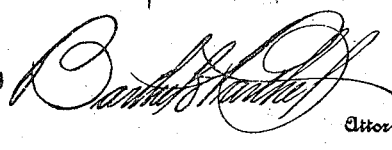
Attorneys

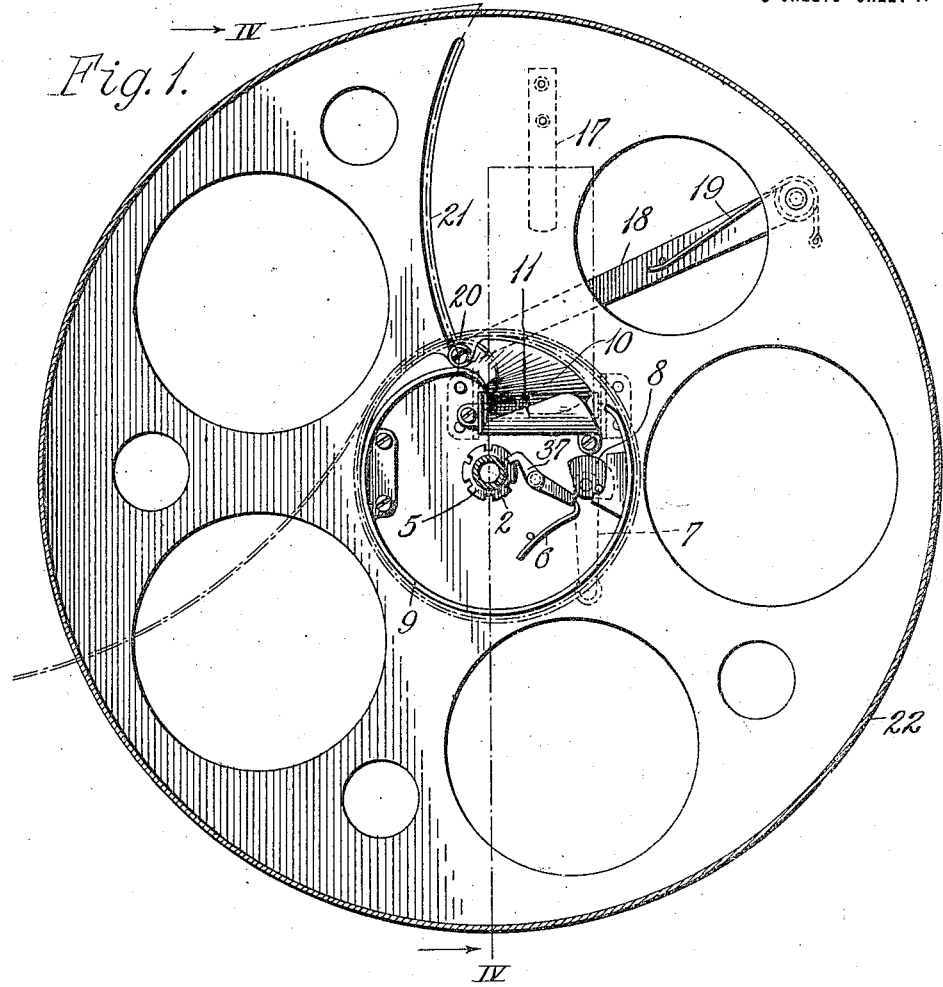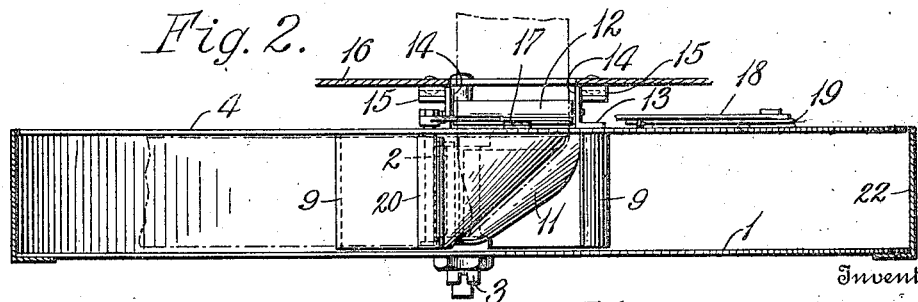

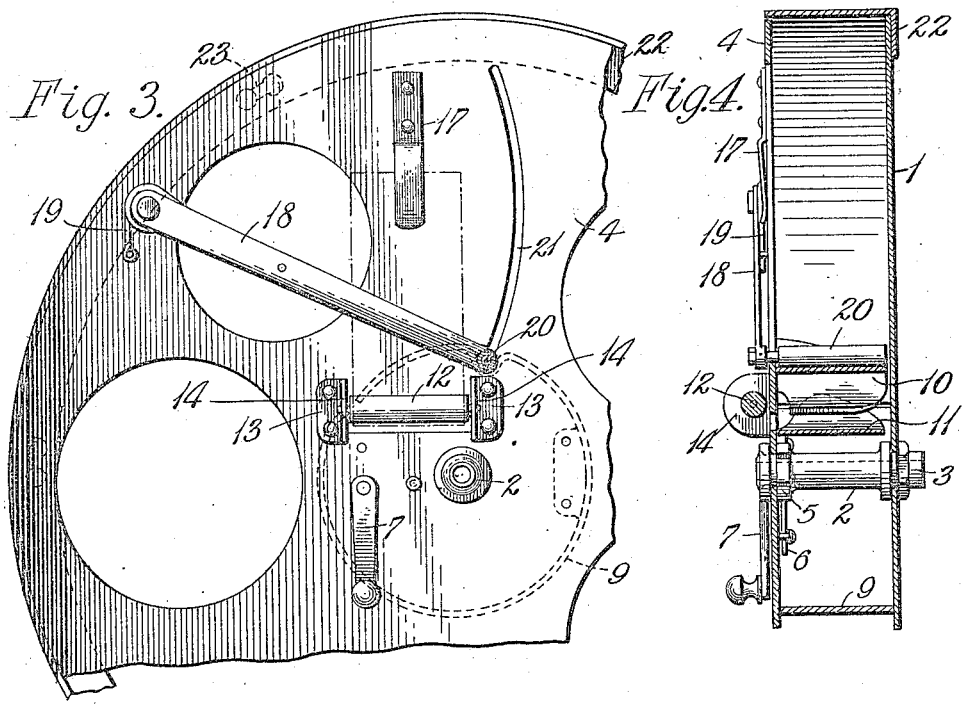

UNITED STATES PATENT OFFICE.

MICHAEL G. DELANEY, OF DETROIT, MICHIGAN, ASSIGNOR, BY MESNE ASSIGNMENTS, TO NORTHERN SALES CO., OF TOLEDO, OHIO, A CORPORATION OF OHIO.

FILM-REEL.

1,144,693.   Specification of Letters Patent.   Patented June 29, 1915.

Application filed December 12, 1912. Serial No. 736,347.

*To all whom it may concern:*

Be it known that I, MICHAEL G. DELANEY, a citizen of the United States of America, residing at Detroit, in the county of Wayne and State of Michigan, have invented certain new and useful Improvements in Film-Reels, of which the following is a specification, reference being had therein to the accompanying drawings.

In the operation of films for moving picture machines and the like it is desirable that as little time as possible be lost in transferring the films after use from one roll to another. Ordinarily it is necessary to rewind the film after it has been used in order to obtain the right direction through the lantern or camera.

This invention relates to a film reel adapted to permit the use of a film without rewinding, thereby saving the wear of the film and the rewinding and loss of time.

The invention consists in the matters hereinafter set forth and particularly pointed out in the claims.

In the drawings, Figure 1 is a view partially in side elevation and partially in section of one form of reel that embodies features of the invention; Fig. 2 is a plan view of the reel partially broken away and in section attached to a moving picture mechanism for central delivery of a film reel; Fig. 3 is a view partially broken away and in elevation of the front of the reel; Fig. 4 is a view in section taken on line IV—IV of Fig. 1; Fig. 5 is a view in detail of the film guiding means, and Fig. 6 is a view in side elevation showing how the reel may be associated in a picture machine.

As herein indicated a reel is formed of a back plate 1 that is fixed on a tubular shaft 2 adapted to be rotatably mounted on any journal and turned as by application of a proper crank to the notched end 3 of the shaft. The journal or bearing member on which the film reel of a moving picture machine is usually mounted in proper position for the delivery of the film from the periphery of the reel into the casing or magazine of the machine, is the member that is used although not shown herein.

A front plate 4 is journaled on the shaft 2 in spaced parallel relation to the plate 1 and may be locked to turn with the shaft by means of a dog 37 arranged to engage the notched periphery 5 of a flange on the shaft, a spring 6 projecting the dog into such engagement.

A handle 7 on the plate 4 operates a cam plate 8 by which the dog 37 may be held in release from the flange 5.

The plate 4 carries a hub flange 9 substantially concentric with the shaft 2 except for an interval where it is cut away and inturned to form a guide shoe 10. A shelf 11 parallel with the guide shoe extends with the latter to a transverse slot in the plate 4.

A guide roller 12 is secured on the outside of the plate 4 parallel to the slot in guide brackets 13 whose projecting flanges 14 are adapted to yieldingly enter between stops 15 on the wall of a magazine 16.

A spring finger 17 opposite the slot is placed on the outer side of the plate 4.

A guide arm 18 is pivoted on the plate 4 and under the influence of a spring 19 carries a guide bar 20 outwardly along a slot 21 concentric with the pivot center of the arm 18.

A cover 22 is used to inclose the reel when desired, a suitable bayonet lock device indicated at 23, or the like, holding the cover in place on the plate 1 to permit a free rotation on the plate 4.

In operation the cover is removed, the film is then drawn on to the reel between the plates which are locked together and carried out around the guide 10 into engagement with the spring clip 17. The film is then run on to the reel in the usual manner by turning the reel, the spring arm 18 carrying the film over the gap in the hub flange 9. When it is desired to use the film again the cover is placed on the reel and the latter mounted as shown in Fig. 2, with the slot in the side delivery plate in register with the intake opening in a magazine or moving picture machine. The plate 1 and plate 4 are disengaged and the film drawn out as desired over the guide, this being easily accomplished as the plate 1 with the cover 22 on which the film bears along its margin is free to turn as necessary and allow the withdrawal of the film without injury.

As a result of this construction the reel is enabled to run a film on and then draw it off through a lantern without the necessity of rewinding as the film is traveling always in the same direction. This obviates the necessity of rewinding as in the use of the ordinary reel and thereby saves time as well as the wear and tear on the film.

Obviously, changes in the details of construction may be made without departing from the spirit of my invention and I do not care to limit myself to any particular form or arrangement of parts.

What I claim is:—

1. A film reel comprising a bearing member with a back plate fixed thereon, a front plate journaled on the bearing member in spaced relation to the back plate and provided with an opening, manually operable means for locking the plates to turn together, film guiding means extending from an opening through the front plate into concentric relation with the bearing member between the plates, and a cover adapted to be locked on the back plate and to encircle the front plate.

2. A film reel comprising a bearing member with a back plate fixed thereon, a front plate journaled on the bearing member in spaced relation to the back plate and provided with an opening, manually operable means for locking the plates to turn together, film guiding means extending from an opening through the front plate into substantially concentric relation with the bearing member between the plates, a cover adapted to be locked on the back plate and to encircle the front plate, and means yieldingly mounted on one of the plates for maintaining a film applied to the reel in operative position.

3. A film reel comprising a bearing member with a back plate fixed thereon, a front plate journaled on the bearing member in spaced relation to the back plate and provided with an opening, manually operable means for locking the plates to turn together, film guiding means extending from an opening through the front plate into substantially concentric relation with the bearing member between the plates, and a cover adapted to be locked on the back plate to encircle the front plate, the front plate being adapted to detachably engage with the wall of a film magazine or holder.

4. A film reel comprising a bearing member with a back plate fixed thereon, a front plate journaled on the bearing member in spaced relation to the back plate and provided with an opening, manually operable means for locking the plates to turn together, film guiding means extending from an opening through the front plate into substantially concentric relation with the bearing member between the plates, a cover adapted to be locked on the back plate and to encircle the front plate, and means yieldingly mounted on one of the plates for maintaining a film applied to the reel in operative position, the front plate being adapted to detachably engage with the wall of a film magazine or holder.

5. The combination with the wall of a film magazine having a lateral opening and stops thereon, of a film reel comprising a hollow bearing member, a back plate secured on the bearing member, a front plate journaled on the bearing member and provided with an opening, means on the front plate adapted to interlock with the stops of the magazine wall to hold the respective openings of the plate and magazine wall in register, manually operable means for locking the front plate to turn with the bearing member, and a guiding member on the front plate extending from the opening therethrough between the plates to direct an applied film into substantially concentric relation with the bearing member.

6. The combination with the wall of a film magazine having an opening in the wall, of a film reel adapted to be rotatably mounted on a suitable support and non-rotatably engaged with the magazine wall, the reel having a lateral opening that is in register with the wall opening and a continuous rim opening, and detachably interlocked front and side walls whereby the front wall may be independently rotated and film guiding means in the reel adapted to direct a film through the reel rim when the reel is turning bodily and through the lateral opening when the plates are disengaged.

7. A film reel having independently rotatable side walls, one of which has a lateral opening, and a continuous rim opening between the walls, means for locking the walls to turn together, guiding means in the reel for holding a film in operative position thereon, means in the reel adapted to permit the winding of a film on to the reel through one opening and the delivery of the film through the other opening and means for yieldingly distending and supporting the film when wound on the reel.

In testimony whereof I affix my signature in presence of two witnesses.

MICHAEL G. DELANEY.

Witnesses:
 ANNA M. DORR,
 OTTO F. BARTHEL.